United States Patent
Krishnappa

(10) Patent No.: US 10,083,298 B1
(45) Date of Patent: Sep. 25, 2018

(54) STATIC APPROACH TO IDENTIFY JUNK APIS IN A MALWARE

(71) Applicant: Symantec Corporation, Mountain View, CA (US)

(72) Inventor: Bhaskar Krishnappa, Bristol (GB)

(73) Assignee: SYMANTEC CORPORATION, Mountain View, CA (US)

( * ) Notice: Subject to any disclaimer, the term of this patent is extended or adjusted under 35 U.S.C. 154(b) by 26 days.

(21) Appl. No.: 14/641,979

(22) Filed: Mar. 9, 2015

(51) Int. Cl.
*G06F 21/56* (2013.01)

(52) U.S. Cl.
CPC .................. *G06F 21/563* (2013.01)

(58) Field of Classification Search
CPC ........ G06F 21/563; G06F 21/50; G06F 21/00; G06F 21/52; G06F 21/56; G06F 21/562; H04L 29/06
See application file for complete search history.

(56) References Cited

U.S. PATENT DOCUMENTS

| | | | | |
|---|---|---|---|---|
| 7,287,283 B1* | 10/2007 | Szor | ........................ | G06F 21/52 713/165 |
| 7,386,886 B1* | 6/2008 | Abrams | ................ | G06F 12/145 709/232 |
| 8,474,046 B1* | 6/2013 | Gong | .................... | G06F 21/554 726/22 |
| 2004/0205411 A1* | 10/2004 | Hong | .................... | G06F 21/566 714/38.1 |
| 2012/0110174 A1* | 5/2012 | Wootton | ............... | G06F 21/564 709/224 |
| 2013/0160128 A1* | 6/2013 | Dolan-Gavitt | ...... | G06F 11/3414 726/25 |
| 2014/0020046 A1* | 1/2014 | Heitzman | ................ | G06F 8/75 726/1 |
| 2014/0096184 A1* | 4/2014 | Zaitsev | ................... | G06F 21/56 726/1 |
| 2014/0165199 A1* | 6/2014 | Li | .......................... | G06F 21/56 726/23 |
| 2016/0057159 A1* | 2/2016 | Yin | ....................... | H04L 63/145 726/23 |
| 2016/0205115 A1* | 7/2016 | Kulkarni | ............... | G06F 21/568 726/1 |
| 2016/0248590 A1* | 8/2016 | Benson | ................. | H04L 9/3247 |

OTHER PUBLICATIONS

Veeramani, Windows API based Malware Detection and Framework Analysis, Mar. 2012.*

(Continued)

*Primary Examiner* — Hadi S Armouche
*Assistant Examiner* — Huan V Doan
(74) *Attorney, Agent, or Firm* — Maschoff Brennan

(57) ABSTRACT

A method for identifying malware is provided. The method includes performing a static analysis of a plurality of files and for each file of the plurality of files, determining in the static analysis whether the file includes an application programming interface (API). For each file, of the plurality of files, found to have an application programming interface, the method includes determining in the static analysis whether the application programming interface is proper in the file and alerting regarding an improper application programming interface when found in one of the plurality of files. A scanner for detecting malware is also provided.

17 Claims, 8 Drawing Sheets

(56) References Cited

OTHER PUBLICATIONS

Alazab et al, Towards Understanding Malware Behaviour by the Extraction of API calls, 2010, IEEE, 8 pages.*
Cowan et al., Buffer Overflows: Attacks and Defenses for the Vulnerability of the Decade, 11 pages (Year: 2010).*
Bai et al, Detecting Malicious Behavior using Critial API calling Graph Matching, IEEE, 4 pages (Year: 2009).*

* cited by examiner

| | Size in bytes |
|---|---|
| MS-DOS header | 64 |
| PE Signature | 4 |
| COFF header | 20 |
| Standard fields | 28 |
| Windows-specific fields | 88 |
| Data directories | variable |
| Section table (each section header is 40 bytes) | variable |

File header: MS-DOS header, PE Signature, COFF header

Optional header: Standard fields, Windows-specific fields, Data directories

Fig. 4B

Based on API and size

| Detection Tag Name | Variants Detected | FPs |
|---|---|---|
| EXE_STRUCTURE_ZBOTS_SUSP_IMPORT_COCOPYPROXY | 179 | 0 |
| EXE_STRUCTURE_ZBOTS_SUSP_IMPORT_DLLCANUNLOADNOW | 179 | 0 |
| EXE_STRUCTURE_ZBOTS_SUSP_IMPORT_DLLREGISTERSERVER | 170 | 0 |
| EXE_STRUCTURE_ZBOTS_SUSP_IMPORT_DLLUNREGISTERSERVER | 849 | 0 |
| EXE_STRUCTURE_ZBOTS_SUSP_IMPORT_GETPROXYDLLINFO | 147 | 0 |
| EXE_STRUCTURE_ZBOTS_SUSP_IMPORT_HEAPSETINFORMATION | 215 | 0 |
| EXE_STRUCTURE_ZBOTS_SUSP_IMPORT_SIZE_DLLGETCLASSOBJECT | 27 | 0 |
| EXE_STRUCTURE_ZBOTS_SUSP_IMPORT_STARTS_WITH_COM | 190 | 0 |
| EXE_STRUCTURE_ZBOTS_SUSP_IMPORT_STARTS_WITH_MS | 129 | 0 |
| EXE_STRUCTURE_ZBOT_SUSP_IMPORT_SIZE_ZERO_R1 | 86 | 0 |
| TRIAL_EXE_STRUCTURE_CRIDEX_SUSP_IMPORT_SHLWAPI_R1 | 96 | 0 |
| TRIAL_EXE_STRUCTURE_ZBOTS_SUSP_IMPORT_DLLREGISTERSERVER | 657 | 0 |
| TRIAL_EXE_STRUCTURE_ZBOTS_SUSP_IMPORT_DLLUNREGISTERSERVER | 730 | 0 |
| TRIAL_EXE_STRUCTURE_ZBOTS_SUSP_IMPORT_INITMUILANGUAGE | 1500 | 0 |
| TRIAL_EXE_STRUCTURE_ZBOTS_SUSP_IMPORT_SIZE_DLLGETCLASSOBJECT | 600 | 0 |
| TRIAL_EXE_STRUCTURE_ZBOTS_SUSP_IMPORT_STARTS_WITH_COM | 548 | 0 |
| TRIAL_EXE_STRUCTURE_ZBOT_SUSP_IMPORT_SIZE_ZERO_R1 | 130 | 0 |

Fig. 4C

Based on parameters

| Variants Detected | Variants Detected | FPs |
|---|---|---|
| EXE_FUNCCALL_FINDATOM_NULL_ARGUMENT | 11,103 | 0 |
| EXE_FUNCCALL_ALLPARAMETERSTHESAME | 6,757 | 0 |
| EXE_FUNCCALL_ANIMATEWINDOW_INVALIDHWND | 28,600 | 0 |
| EXE_FUNCCALL_API_IS_NOT_A_FUNCTION | 1,580 | 0 |
| EXE_FUNCCALL_CLEAREVENTLOG_INVALID_HEVENTLOG | 580 | 0 |
| EXE_FUNCCALL_COPYFILE_INVALID_BFAILIFEXISTS | 14,370 | 0 |
| EXE_FUNCCALL_CREATEFONT_INVALIDFDWITALICPARAMETER | 495 | 0 |
| EXE_FUNCCALL_CREATEMUTEX_INVALIDBINITIALOWNERPARAMETER | 12,113 | 0 |
| EXE_FUNCCALL_CREATETOOLBAREX | 907 | 0 |

Fig. 4D

STATIC APPROACH TO IDENTIFY JUNK APIS IN A MALWARE

BACKGROUND

Malware writers take many approaches to produce malware that evades detection. Their products continue to infect computer systems worldwide. Many malware detection systems look for distinct signatures of known malware files. Yet, hackers often modify previously detected malware by adding new code, which alters the signature. One method of detecting malware involves emulation, in which a suspect file is emulated in a safe environment. Another method of detecting malware involves execution of a suspect file in a "sandbox". However, emulation and operation in a sandbox are time-consuming and are typically used for testing individual examples of suspected malware, after which a signature is developed. They are presently impractical for detecting and screening massive amounts of malware. Therefore, there is a need in the art for a solution which overcomes the drawbacks described above.

SUMMARY

In some embodiments, a method, performed by at least one processor for identifying malware is provided. The method includes performing a static analysis of a plurality of files and for each file of the plurality of files, determining in the static analysis whether the file includes an application programming interface (API). For each file, of the plurality of files, found to have an application programming interface, the method includes determining in the static analysis whether the application programming interface is proper in the file and alerting regarding an improper application programming interface when found in one of the plurality of files.

In some embodiments, a tangible, non-transitory, computer-readable media having instructions thereupon which, when executed by a processor, cause the processor to perform a method. The method includes detecting, using static analysis, an application programming interface (API) in a file and determining, using the static analysis, that the application programming interface is improper in the file. The method includes indicating that the file includes suspected malware, based on the determining.

In some embodiments, a scanner for malware detection is provided. The scanner includes a processor, an input/output (I/O) module configured to access a plurality of files, and a malware detection engine configured to perform static analysis of the plurality of files. The static analysis including detecting one or more application programming interfaces in a file and determining whether each of the one or more application programming interfaces in the file is in accordance with specification information regarding application programming interfaces. The static analysis includes indicating suspected malware upon determining that at least one of the one or more application programming interfaces in the file is not in accordance with the specification information.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4B is a guide to sections of the portable executable file of FIG. 4A.

FIG. 4C shows examples of malware detected by the system of FIG. 2 and the method of FIG. 3.

FIG. 4D shows examples of detection of malware based on parameters.

DETAILED DESCRIPTION

Application programming interface (API) calls are used by various applications to achieve various goals. Generally, an application programming interface is designed to take one or more parameters as input and provide one or more parameters as output, in order to help an application achieve a goal. Attackers (hackers) often install junk calls in malware as an obfuscation approach, to deceive malware detection written by antivirus (AV) researchers. Insertion of a junk application programming interface (e.g., an improper application programming interface) is used as leverage to pass invalid parameters to evade antivirus detection. Junk calls often do not do much other than accepting junk parameters or sometimes null parameters, and returning unwanted or null values. This may cause an emulator to fail, which is desirable for a hacker seeking to have malware evade detection. The challenge for antivirus engines is to identify if a call made by an application is useful or a junk call. It is desired to form an approach, described herein, to detect junk calls effectively without consuming too many CPU (central processing unit) cycles during antivirus scanning.

Some application programming interfaces are part of a built-in package when certain compilers are used to compile code, for example mingGW™, Delphi™, etc. Present embodiments for malware detection can identify application programming interfaces that are inserted by hackers, not part of a built-in package, and which may call externally using certain libraries. A file with an improper application programming interface, not in compliance with specifications for application programming interfaces, is identified as suspected malware. Various embodiments described herein use static analysis of files, and do not require emulation of a file.

Figure 1:
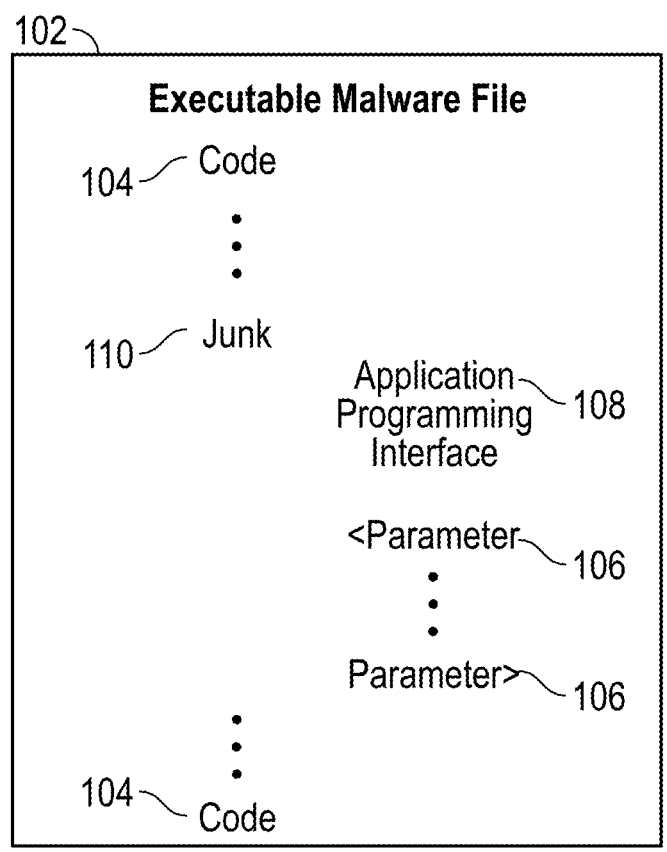
FIG. 1 is an example of an executable malware file with code and a junk API (application programming interface), which is inserted in attempt to evade malware detection.

FIG. 1 is an example of an executable malware file 102 with code 104 and a junk API 110 (e.g., application programming interface 108), which is inserted in attempt to evade malware detection. Typically, the code 104 is malicious, and may be newly written or reused from other malware with recognized signatures. The junk API 110 is inserted to disguise the executable malware file 102 by changing the signature and crashing emulators. The application programming interface 108 has various parameters 106, some input, some output. Embodiments of a scanner 202 with a malware detection engine 206, as described with reference to FIG. 2, are designed to detect the executable malware file 102.

Figure 2:
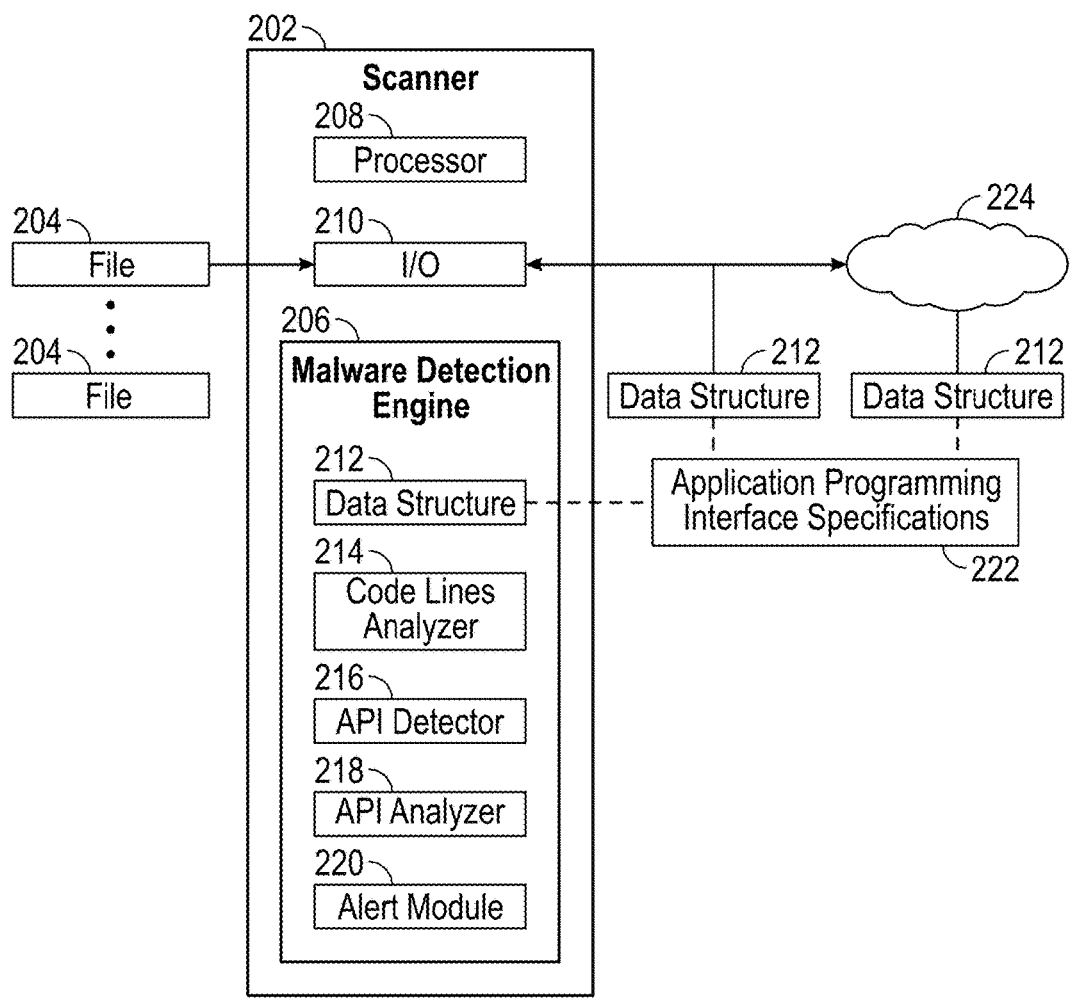
FIG. 2 is a system diagram of a scanner with a malware detection engine that analyzes application programming interfaces in files, in accordance with the present disclosure.

FIG. 2 is a system diagram of a scanner 202 with a malware detection engine 206 that analyzes application programming interfaces 108 in files 204, in accordance with the present disclosure. The scanner 202 has a processor 208 (which could include multiple processors), an input output (I/O) module 210 and various further computing resources, and can be implemented on a server or other computing device. The I/O module 210 couples to a network, which could be an intranet or the global communication network known as the Internet, herein depicted as the cloud 224. The malware detection engine 206 can be implemented as software, executing on the processor 208, or as hardware, firmware, or combinations thereof.

Application programming interface specifications 222 are included in or referenced by one or more data structures 212, which could be internal to the scanner 202, external to the scanner 202 and local, or remote from the scanner 202, e.g., out in the cloud 224. This relationship is depicted by the dashed lines in FIG. 2. The purpose of the application programming interface specifications 222 is to provide information regarding proper use of application programming interfaces, and expected numbers, values and usage of parameters of application programming interfaces, for comparison with application programming interfaces encountered by the malware detection engine 206. To support this purpose, the data structure 212 has information relating to proper usage of application programming interfaces 108 in general, in a format suitable for use by the malware detection engine 206. For example, the data structure 212 could include a database, one or more tables, lists, pointers, links or other tools showing relationships among entries of the data structure 212. The scanner 202 accesses files 204 through the I/O module 210. For example, in an embodiment implemented in a server, the server could read each file 204 singly, or read groups of files 204 in parallel, etc. Each file 204 undergoes static analysis by the malware detection engine 206, which looks for improper application programming interfaces in the files 204.

The malware detection engine 206 has a code lines analyzer 214, an application programming interface detector 216, an application programming interface analyzer 218, and an alert module 220, in the embodiment depicted in FIG. 2. Each of these can be implemented as a software module, or in firmware or hardware or combinations thereof, or these can be combined in various ways as readily devised as components, subcomponents, integrated components and so on. The code lines analyzer 214 analyzes lines of code in the file 204, as part of the static analysis. The application programming interface detector 216 cooperates with the code lines analyzer 214, and detects any application programming interface 108 in a file 204. This includes determining whether the file 204 has one or more application programming interfaces 108. If the file examined does have one or more application programming interfaces 108, the application programming interface analyzer 218 analyzes each application programming interface 108. Such analysis is further described below. The alert module 220 indicates a file that includes suspected malware, based on results of the analysis performed by the application programming interface analyzer 218. This alert could be done by sending a message, flagging the file, or writing to the data structure 212, etc., and the alert may be visual or audio based.

In various embodiments, the application programming interface analyzer 218 looks for, or detects, improper application programming interfaces 108 in files 204, such as by performing one or more of the following tests and determinations. In some embodiments, the application programming interface analyzer 218 rates files 204 as to compliance to specification information regarding application programming interfaces, such as obtained from the data structure 212. The determination of whether to declare a file as suspected malware is then based on this rating. Each test involves determining what type of application programming interface 108 is included in a file 204, and retrieving information about expected parameter values and usage of the application programming interface 108 from the data structure 212. Once this information is available, the application programming interface analyzer 218 can compare the application programming interface 108, the input and output parameters 106 of the application programming interface 108, and the usage of the application programming interface 108 in further code 104 of the file 204 to the expected parameter values and usage.

A first test is based on the import size of the parameters or code of the application programming interface 108 in some embodiments. That is, a particular application programming interface 108 may be expected to import a certain amount of parameters or code, according to the application programming interface specifications 222 and the related information in the data structure 212. The application programming interface analyzer 218 determines the import size of the application programming interface 108 in the file 204, and compares this to the expected size. If the import size of the application programming interface 108 in the file 204 is less than the expected size, the application programming interface 108 in the file 204 is improper, and the file 204 may be identified as suspected malware. In some embodiments, the file 204 is rated according to how much less (or how close to the expected size) the import size is.

A second test is based on supporting application programming interfaces 108 in some embodiments. Some application programming interfaces 108 are expected to have one or more supporting application programming interfaces 108 also present in a file, according to application programming interface specifications 222 and related information in the data structure 212. The application programming interface analyzer 218 determines whether the application programming interface 108 in the file 204 is expected to have one or more supporting application programming interfaces 108. If so, the application programming interface analyzer 218 determines whether the expected one or more supporting application programming interfaces 108 are present in the file 204. If not, the file 204 may be identified as suspected malware. In some embodiments, the file 204 is rated according to the presence or absence of a supporting application programming interface 108 and whether or not this is expected.

A third test is based on the number of input parameters 106 in the application programming interface 108 in some embodiments. This test may be context dependent, and is represented in the data structure 212 based on the application programming interface specifications 222. For example, an application programming interface 108 for a hospital patient database could be expected to have hundreds or thousands of patient names as input parameters 106, but a junk API 110 might specify only a few input parameters 106. The application programming interface analyzer 218 determines the expected number of input parameters 106 for the application programming interface 108 in the file 204, determines the actual number of input parameters 106 for the application programming interface 108 in the file 204, and compares these. If the application programming interface 108 in the file 204 has less than the expected minimum number of input parameters 106 (i.e. has fewer input parameters 106 than expected), the file 204 may be identified as suspected malware. In some embodiments, the file 204 is rated according to how much less (or how close to the expected minimum) the number of input parameters 106 is.

A fourth test is based on parameter values passed to the application programming interface 108 in some embodiments. The application programming interface specifications 222 and related information in the data structure 212 qualifies and/or quantifies parameter values. For example, some parameters 106 are expected to be (i.e., have values that are) numerical, others are alphabetical, some are in ASCII code, some are in binary or hexadecimal, numbers have various ranges, and so on. The application programming interface analyzer 218 determines the parameters 106 and values of the parameters 106 in the application programming interface 108 in the file 204, and compares these to the expected parameter values. If one or more values are not valid, the file 204 may be identified as suspected malware. In some embodiments, the file 204 is rated according to how many parameters 106 are invalid.

A fifth test is based on usage of values returned by an application programming interface 108 in some embodiments. Generally, with proper application programming interfaces 108, an output parameter 106 of the application programming interface 108 has a value which is then used in code 104 of the file 102. The application programming interface analyzer 218 cooperates with the code lines analyzer 214 in the malware detection engine 206 to analyze usage of output parameter values in the code 104 of the file 204. If the output parameter value from the application programming interface 108 is found to not be useful in the code 104 of the file 204, the file 204 may be identified as suspected malware. For example, if the output parameter value is loaded into a particular register of the processor 208, but the code 104 never references that register of the processor 208, then the output parameter value is never used in the code 104. Or, if the output parameter value is loaded into a register and that register is overwritten by some code 104, then the output parameter value is never used in a useful manner. If the code 104 does not reference the output parameter value, that output parameter value is ignored by and never used in the code 104. If the code 104 discards an output parameter value, that output parameter value is never used properly. It should be appreciated that further examples of files and code 104 that do not make proper use of values returned by an application programming interface 108 are readily devised, as are tests for finding such code 104, and the examples provided above are not meant to be limiting. In some embodiments, the file 204 is rated according to whether or not the code 104 of the file 204 makes proper use of output parameter values and/or what operations are performed on output parameter values, or how many output parameter values are properly or improperly used, or not properly used at all.

In embodiments of the malware detection engine 206 with a rating system, the ratings for whichever tests are applied are added up, or processed according to some other formula or algorithm, and compared to a threshold. If only one test is applied, the rating for that test is compared to the threshold. If the rating or combined rating is greater than the threshold, the file 204 is identified as suspected malware. Rating could be in various scales, such as binary, indicating compliance versus noncompliance, or numerical or alphabetical over a predefined range, etc., as readily devised in accordance with the teachings herein.

Figure 3:
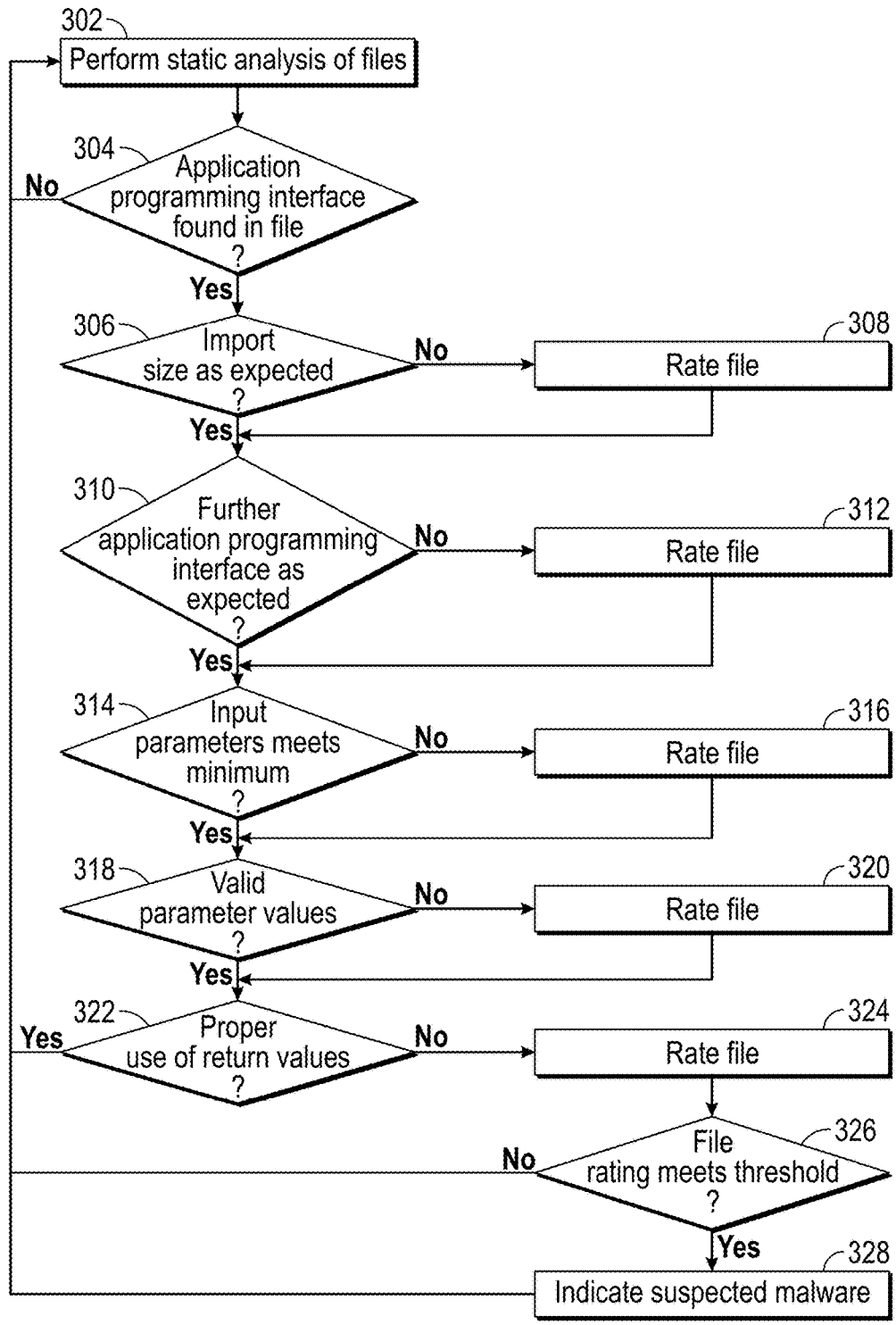
FIG. 3 is a flow diagram of a method for detecting malware, which can be practiced on or by the system of FIG. 2, to detect malware such as shown in FIG. 1.

FIG. 3 is a flow diagram of a method for detecting malware, which can be practiced on or by the system of FIG. 2, to detect malware such as shown in FIG. 1. The method can be practiced by a processor, such as a processor of a scanner or a server. In an action 302, a static analysis of files is performed. This could be performed in sequence, or in parallel, by one or more processors. In a decision action 304, it is determined whether a programming interface is found in a file. If no application programming interface is found in a file, the flow branches back to the action 302, to continue performing static analysis of files. If an application programming interface is found in a file, flow proceeds to the decision action 306. The decision actions 306, 310, 314, 318, 322 can be performed in various orders in variations of the method, and further embodiments of the method employ one, a subset, or all of these, with flow proceeding from the decision action 304 accordingly.

In the decision action 306, it is determined whether the import size of the application programming interface found in the file is as expected. This could be determined by comparing to information regarding application programming interface specifications as found in a data structure and described above with reference to FIG. 2. If the determination result is that the import size is not as expected, flow proceeds to the action 308 in order to rate the file. In the action 308, the file is rated according to a result of the decision action 306, and may be suspected malware. Flow proceeds from the action 308 to the decision action 310. If the determination result is that the import size is as expected, flow proceeds to the decision action 310.

In the decision action 310, it is determined whether there is a further application programming interface in the file, as expected. This applies when the information regarding application programming interface specifications indicates a supporting application programming interface is expected, for the application programming interface found in the decision action 304. When no supporting application programming interface is expected, the decision action 310 can be skipped. Or, a modified version of the method could add an action to determine whether a supporting application programming interface is expected. If the result of the decision action 310 is that there is a further application programming interface in the file as expected, flow proceeds to the decision action 314. If the result of the decision action 310 is that there is no further application programming interface in the file, but one is expected, then flow branches to the action 312, in order to rate the file. In the action 312, the file is rated according to a result of the decision action 310, and may be suspected malware. Flow then proceeds to the decision action 314.

In the decision action 314, it is determined whether the number of input parameters of the application programming interface meets a minimum expected count. This could be determined by comparing to information regarding application programming interface specifications as found in a data structure and described above with reference to FIG. 2. If the result of the determination is that the number of input parameters meets the minimum expected count, flow proceeds to the decision action 318. If the result of the determination is that the number of input parameters does not meet the minimum expected count, flow proceeds to the action 316, in order to rate the file. In the action 316, the file is rated according to a result of the decision action 314, and may be suspected malware. Flow then proceeds to the decision action 318.

In the decision action 318, it is determined whether the parameter values of the application programming interface are valid. This could be determined by comparing to information regarding application programming interface specifications as found in a data structure and described above with reference to FIG. 2. If the result of the determination is that all parameter values are valid, flow proceeds to the decision action 322. If the result of the determination is that one or more parameter values are not valid, flow proceeds to the action 320 in order to rate the file. In the action 320, the file is rated according to a result of the decision action 318, and may be suspected malware. Flow then proceeds to the decision action 322, where it is determined whether the return value or values of the application programming interface are properly used in the file. This could be determined by analyzing code of the file to see if the code makes proper use of the return value(s), or discards, overwrites or ignores the return value(s). If the result of the determination is that the code makes proper use of the return value or values, flow branches back to the action 302, in order to perform static analysis of further files. If the result of the determination is that the code does not make proper use of the return value or values, flow proceeds to the action 324, in order to rate the file. In the action 324, the file is rated according to a result of the decision action 322, and may be suspected malware. Flow then proceeds to the decision action 326.

In the decision action 326, it is determined whether the file rating meets a threshold. If the file rating does not meet the threshold, the file is not suspected malware, and flow branches back to the action 302, in order to continue performing static analysis of files. If the file rating does meet the threshold, flow proceeds to the action 328, in which the file is indicated as suspected malware. Various indications could be issued, as described above with reference to FIG. 2 and an alert module. Flow then returns to the action 302, to continue performing static analysis of files. In variations, the file is rated according to results of one, a subset, or all of the decision actions 306, 310, 314, 318, 322 in various orders. The threshold could be relative to each of the tests, or could be a combined threshold for all of the tests, or combinations thereof.

Figure 4A:
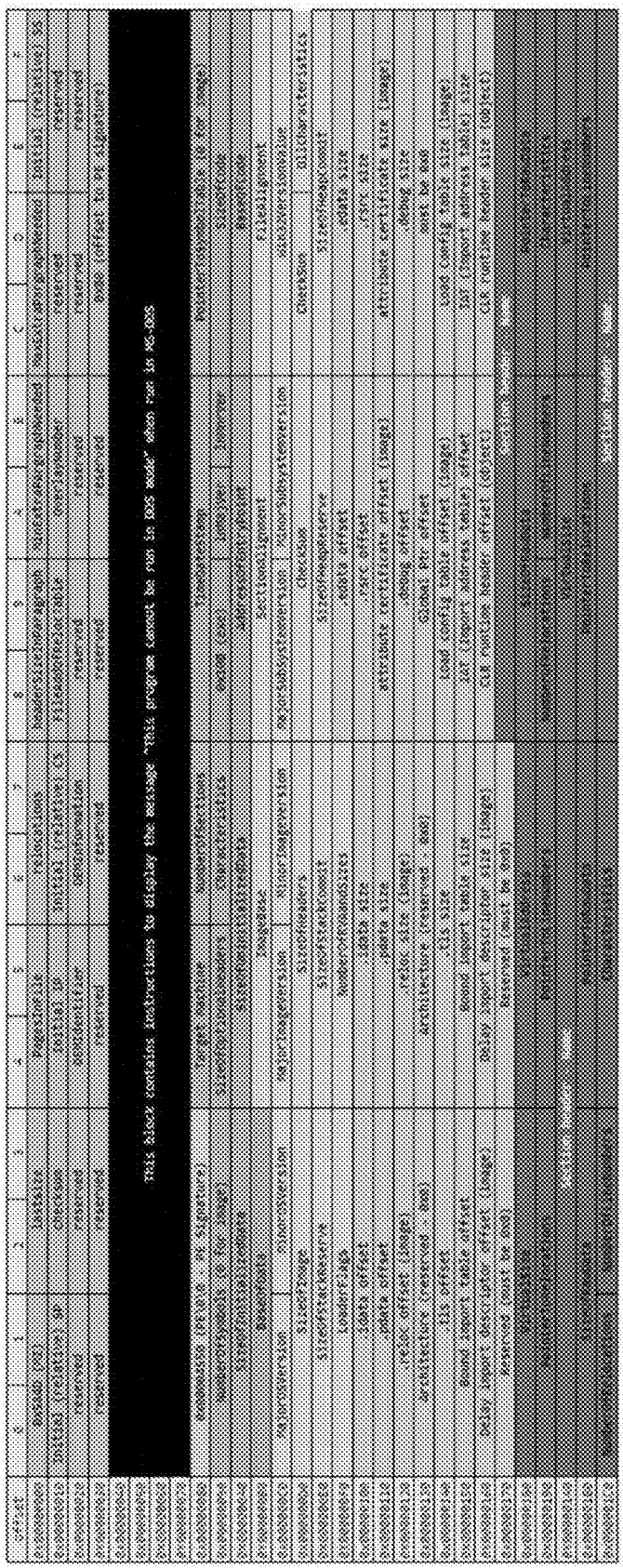
FIG. 4A is an example file format for a portable executable (PE) file, showing file contents that can be analyzed by the system of FIG. 2 and the method of FIG. 3 to detect malware.

FIG. 4A is an example file format for a portable executable (PE) file, showing file contents that can be analyzed by the system of FIG. 2 and the method of FIG. 3 to detect malware. The example identifies a block that contains instructions to display a message, "This program cannot be run in DOS mode" when run in MS-DOS. The message could be displayed, using an application programming interface. The malware detection system of FIG. 2 could analyze parameters of the application programming interface, and if the parameters are set up to display an empty message box, this could be flagged as indicative of possible malware. If the parameters show that there is no box for "okay" or "close", this could be flagged as suspicious, since message boxes normally include a mechanism for a user to close the message box. If the application programming interface needs three parameters, but only two parameters are passed, or if the application programming interface needs a string, but instead a parameter that is passed is not readable (e.g., not ASCII characters) or is empty or null, this could be flagged. Of further interest in the file is a section relating to import. The section references import data, showing an import data size, an import table, an import table offset, an import table size, an import address table offset and size, an import descriptor offset and size, etc. The malware detection system of FIG. 2 could analyze the size of the table to be imported, and compare this to an expected size of a table according to information about that particular application programming interface and the types and sizes of tables associated with that particular application programming interface. If the code in the executable file indicates importing a table of insufficient size compared to the expected size of the table, this could be flagged as indicative of possible malware.

For example, a file could include reference to a component object model (COM) application programming interface. The data structure 212 (of FIG. 2) could have information that indicates the expected size of an import table for a component object model application programming interface should be about one or two megabytes. However, if the file being analyzed indicates that it is importing a much smaller table for the component object model application programming interface, this could be flagged as indicative of possible malware. As a further example, a file could include reference to a screensaver application programming interface. Usually, the screensaver application programming interface would also be accompanied by a keystroke application programming interface, in order to accept password entry (if the screen is password-protected) or any keystroke (if the screen is not password-protected) to exit the screensaver and return to other operation. However, if the malware detection system or method finds that there is a screensaver application programming interface in the file but finds no keystroke application programming interface present in the file, this could be flagged as suspicious. Some embodiments of the malware detection system and method recognize that certain compilers insert default application programming interfaces when an executable is compiled. In such cases, the system can find manually inserted application programming interfaces and analyze these for irregularities, i.e., improper usage that indicates possible malware.

FIG. 4B is a guide to sections of the portable executable file of FIG. 4A. The guide shows where headers, various fields, data directories and section tables are located in the file. The code lines analyzer, application programming interface detector, and application programming interface analyzer could apply information relating to such a guide, to detect and analyze application programming interfaces in files in accordance with some embodiments. FIG. 4C shows examples of malware detected by the system of FIG. 2 and the method of FIG. 3. In this example, the "ZBOTS" malware and numerous variants are detected using tests of expected size, with no false positives in the detection. Various aspects of importing are analyzed by the system, using tests as described above. It should be appreciated that code lines analyzer, application programming interface detector, and application programming interface analyzer of FIG. 2 could be utilized to detect and analyze these executables in files in accordance with some embodiments. FIG. 4D shows examples of detection of malware based on parameters. The "FINDATOM" (an actual application programming interface) is observed with a null argument in a large number of variants detected. All parameters having the same value shows a large number of variants detected. The function call "ANIMATEWINDOW" (an actual application programming interface) is observed with invalid parameters. A function call to a particular application programming interface is observed as not having a function. The event log for "CLEAREVENTLOG" is observed having invalid parameters. Further examples of invalid parameters are shown in FIG. 4D as readily understood by the person of skill in the art. It should be appreciated that code lines analyzer, application programming interface detector, and application programming interface analyzer described above with reference to FIG. 2 could be utilized to detect and analyze these APIs in files in accordance with some embodiments.

With reference to FIGS. 1-4D, the disclosed system and method detect malware by applying static checks of executable files. Furthermore, the embodiments avoid the need for emulation, and the code size for performing the checks is relatively small, on the order of a few kilobytes, which executes relatively quickly in few cycles. Static data is analyzed, in order to determine whether the usage of each application programming interface encountered in a file is proper. Malware variants, in which previously detected malware (with a recognized signature) is modified to evade detection, are readily detected using the described techniques. Application programming interfaces are found by looking at the executable file. Aspects of the application programming interface, such as size, parameters, and usage of parameter values, are checked and compared with information in a data structure, which could be local or cloud-based. The described system and method are applicable specifically to portable executables, and also to any file format that includes a preloaded application programming interface. Since static checks performed by a processor are used, the system is able to analyze massive amounts of files much more rapidly than emulation techniques allow, and far more rapidly than manual analysis of files could ever allow.

Figure 5:
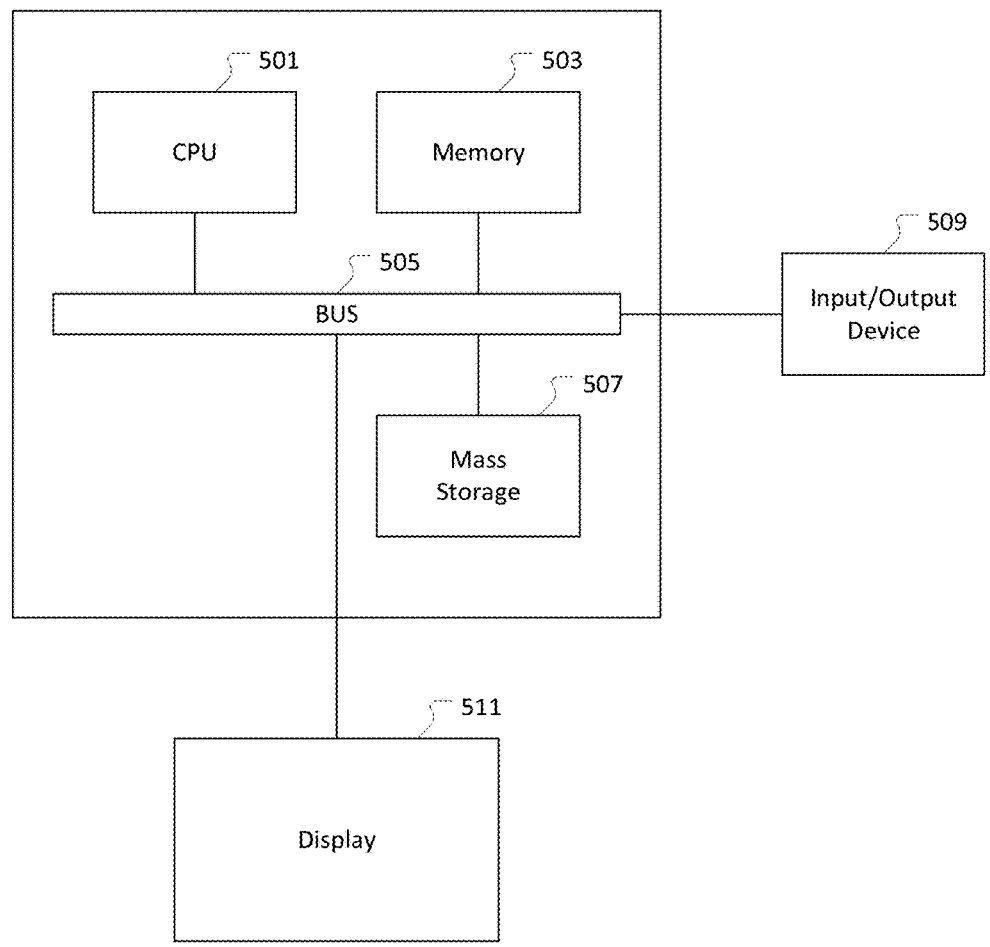
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for malware detection in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-3. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, performed by at least one processor, for identifying malware, comprising:
   performing a static analysis on each of a plurality of files;
   for each file of the plurality of files, determining in the static analysis whether the file includes code with an application programming interface (API) call;
   for each file, of the plurality of files, found to include code with an API call, determining in the static analysis whether the API call is a junk API call, the determining including determining whether the API call returns an output value that is discarded and never used in any subsequent operation except storing the output value in a storage operation by writing the output value to a register of a processor but the code of the file subsequently overwriting the register of the processor; and
   alerting regarding one or more junk API calls found in one of the plurality of files.

2. The method of claim 1, wherein the determining of whether the API call is a junk API call further includes comparing a size of code or data of the API call to an expected size of code or data according to a specification regarding the API.

3. The method of claim 1, wherein the determining of whether the API call is a junk API call further includes determining whether the file includes a further API call expected as support for the API call found in the file, according to a specification regarding the API.

4. The method of claim 1, wherein the determining of whether the API call is a junk API call further includes determining whether the API call has at least an expected minimum number of input parameters according to a specification regarding the API.

5. The method of claim 1, wherein the determining of whether the API call is a junk API call further includes determining whether the API call has a correct number or type of parameter values according to a specification regarding the API.

6. The method of claim 1, wherein the static analysis excludes emulation.

7. A tangible, non-transitory, computer-readable media having instructions thereupon which, when executed by a processor, cause the processor to perform a method comprising:
   detecting, using static analysis, an application programming interface (API) call in code of a file;
   determining, using the static analysis, that the API call is a junk API call, the determining including determining whether the API call returns an output value that is discarded and never used in any subsequent operation except storing the output value in a storage operation by writing the output value to a register of a processor but the code of the file subsequently overwriting the register of the processor; and
   indicating that the file includes suspected malware, based on the determining.

8. The computer-readable media of claim 7, wherein the determining that the API call is a junk API call further includes determining that an import size of the API call is less than an expected size, according to information in a data structure.

9. The computer-readable media of claim 7, wherein the determining that the API call is a junk API call further includes determining that the file lacks a supporting API call that is expected for the API call detected in the file, according to information in a data structure.

10. The computer-readable media of claim 7, wherein the determining that the API call is a junk API call further includes determining that the API call has fewer input parameters than expected, according to information in a data structure.

11. The computer-readable media of claim 7, wherein the determining that the API call is a junk API call further includes determining that the API call has at least one input parameter with an invalid value, according to information in a data structure.

12. The computer-readable media of claim 7, wherein the method further comprises:
   rating, using the static analysis, the API call and usage of the API call in the file as to compliance to specification information regarding APIs, wherein the determining is based on the rating.

13. A scanner for malware detection, comprising:
   a microprocessor;
   an input/output (I/O) module configured to access a plurality of files; and
   a malware detection engine, configured to perform a static analysis on each of the plurality of files including:
      detecting one or more API calls in code of the file;
      determining whether each of the one or more API calls in the file is a junk API call, the determining including determining whether the API call returns an output value that is discarded and never used in any subsequent operation except storing the output value in a storage operation by writing the output value to a register of a processor but the code of the file subsequently overwriting the register of the processor, based on specification information regarding APIs; and
   indicating suspected malware upon determining that at least one of the one or more API calls in the file is a junk API call not in accordance with the specification information.

14. The scanner of claim 13, wherein:
the malware detection engine has a code lines analyzer configured to analyze lines of code of the file; and
the detecting and the determining are performed in cooperation with the code lines analyzer.

15. The scanner of claim 13, wherein:
the malware detection engine has an API detector configured to perform the detecting;
the malware detection engine has an API analyzer configured to cooperate with the API detector and configured to perform the determining; and
the API analyzer is configured to access at least one data structure that includes or references the specification information and is included in the scanner, coupled to the scanner, or remote from the scanner.

16. The scanner of claim 13, wherein:
the malware detection engine is configured to rate the file as to at least one of:
   import size of code or data of the one or more API calls in comparison with the specification information;
   presence or absence of a further API call in case the further API call is expected, according to the specification information, to support the one or more API calls in the file;
   number of input parameters of the one or more API calls in comparison with the specification information;
   validity of parameter values of the one or more API calls relative to the specification information; or
   use, in code of the file, of parameter values returned by the one or more API calls; and
the determining that at least one of the one or more API calls in the file is a junk API call not in accordance with the specification information is further based on the rating.

17. The scanner of claim 13, wherein:
the malware detection engine has an alert module configured to communicate the indicating suspected malware via the I/O module, using one of: a message, a flag, or writing to a data structure.

* * * * *